United States Patent

Cantin et al.

[11] Patent Number: 5,251,114
[45] Date of Patent: Oct. 5, 1993

[54] ACTUATOR FOR CONTROLLING THE ORIENTATION OF A MOTOR VEHICLE HEADLAMP

[75] Inventors: Jean-Pierre Cantin, St. Cheron; Gérard Hallier, Arpajon, both of France

[73] Assignee: Valeo Vision, Bobigny Cedex, France

[21] Appl. No.: 703,818

[22] Filed: May 21, 1991

[30] Foreign Application Priority Data

May 25, 1990 [FR] France .................. 90 06515

[51] Int. Cl.⁵ .................. B60Q 1/04; F21M 3/18
[52] U.S. Cl. .................. 362/286; 362/66; 362/272; 362/428
[58] Field of Search .................. 362/66, 69, 271, 272, 362/286, 289, 418, 421, 422, 423, 428

[56] References Cited

U.S. PATENT DOCUMENTS

| 4,574,334 | 3/1986 | Igura | 362/66 |
| 4,916,587 | 4/1990 | Hirose et al. | 362/66 |

FOREIGN PATENT DOCUMENTS

| 0171318 | 2/1986 | European Pat. Off. . |
| 0291379 | 11/1988 | European Pat. Off. . |
| 3915019 | 11/1989 | Fed. Rep. of Germany ...... 362/272 |
| 3915302 | 11/1989 | Fed. Rep. of Germany ...... 362/272 |
| 2499916 | 8/1982 | France . |
| 2643318 | 8/1990 | France . |
| 0064548 | 4/1986 | Japan .................................. 362/66 |
| 0200044 | 9/1986 | Japan .................................. 362/66 |
| 0229628 | 10/1986 | Japan .................................. 362/66 |

Primary Examiner—Ira S. Lazarus
Assistant Examiner—Y. Quach
Attorney, Agent, or Firm—Dennison, Meserole, Pollack & Scheiner

[57] ABSTRACT

An actuator for adjusting the setting of a motor vehicle headlamp includes a body which comprises a housing closed by a cover, with a sliding actuating rod mounted in the body and passing through a front wall of the housing of the body. Also within the body is a reversible electric motor for operating the sliding actuating rod through a mechanical transmission, which includes a drive member that engages with the actuating rod. The front wall of the housing carries at least one inwardly projecting lateral wall, which is arranged to support an intermediate element that forms part of the mechanical transmission device and which engages with the drive element.

15 Claims, 6 Drawing Sheets

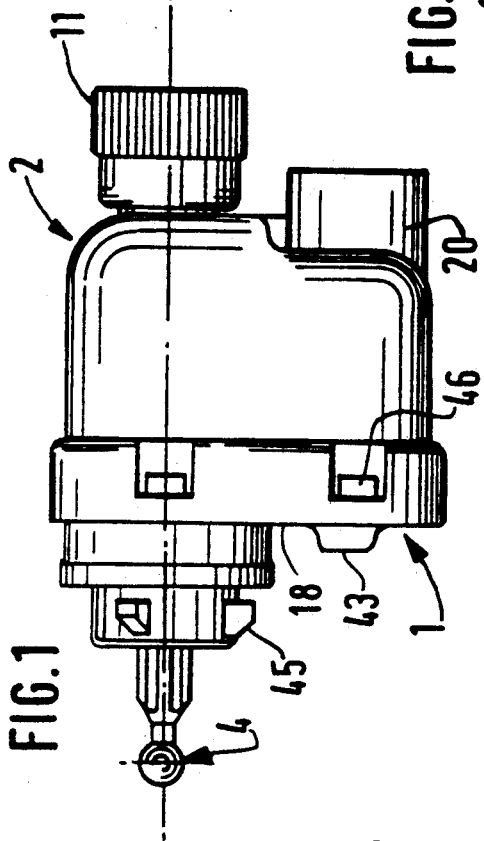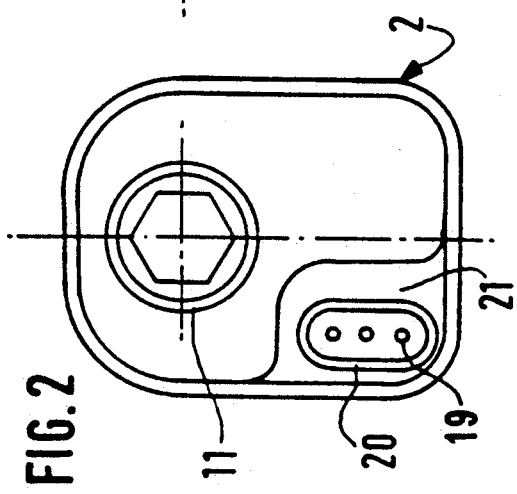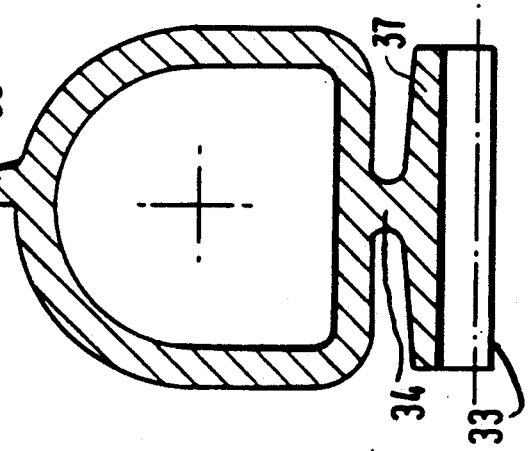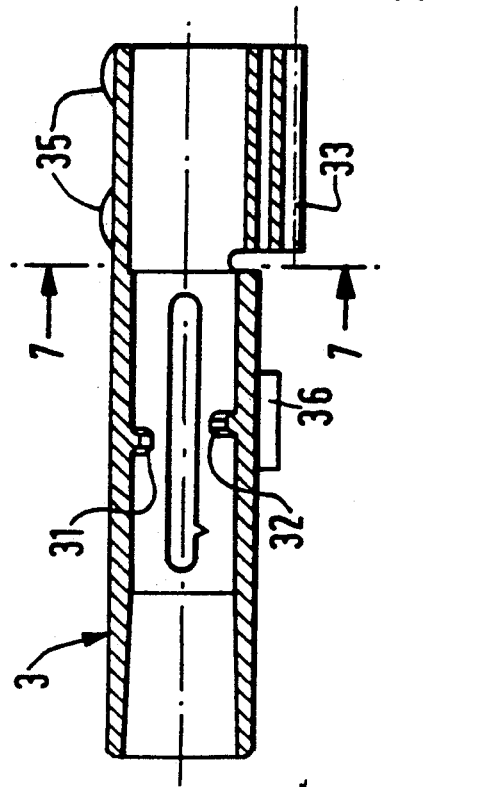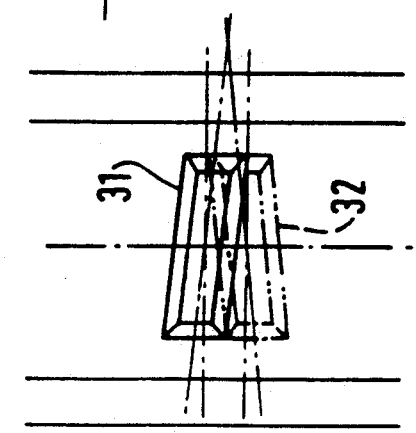

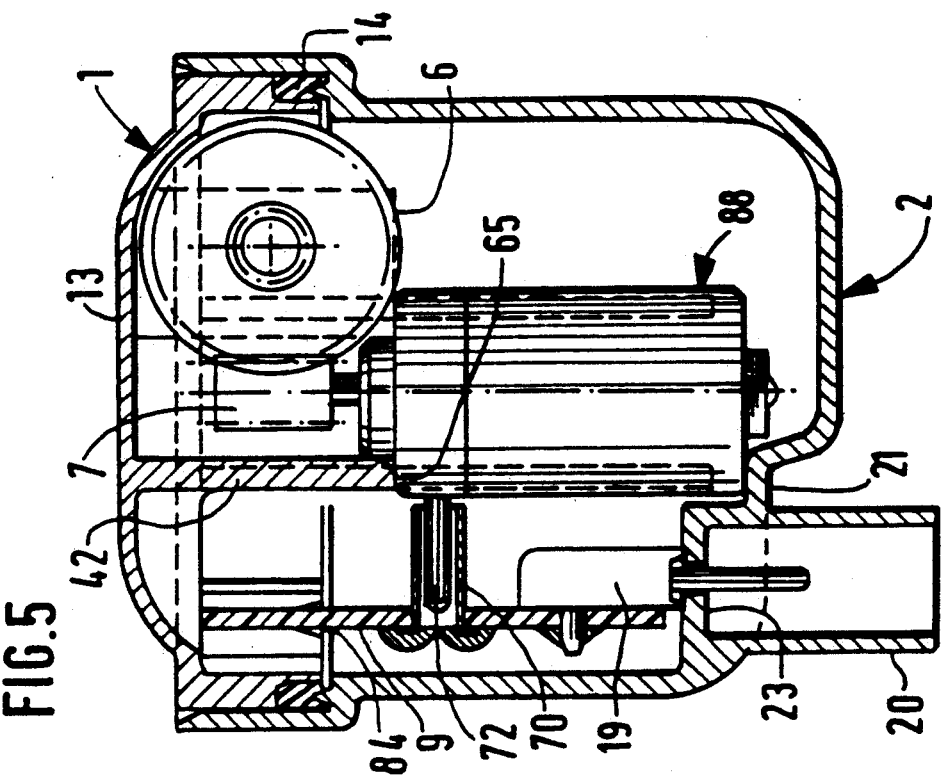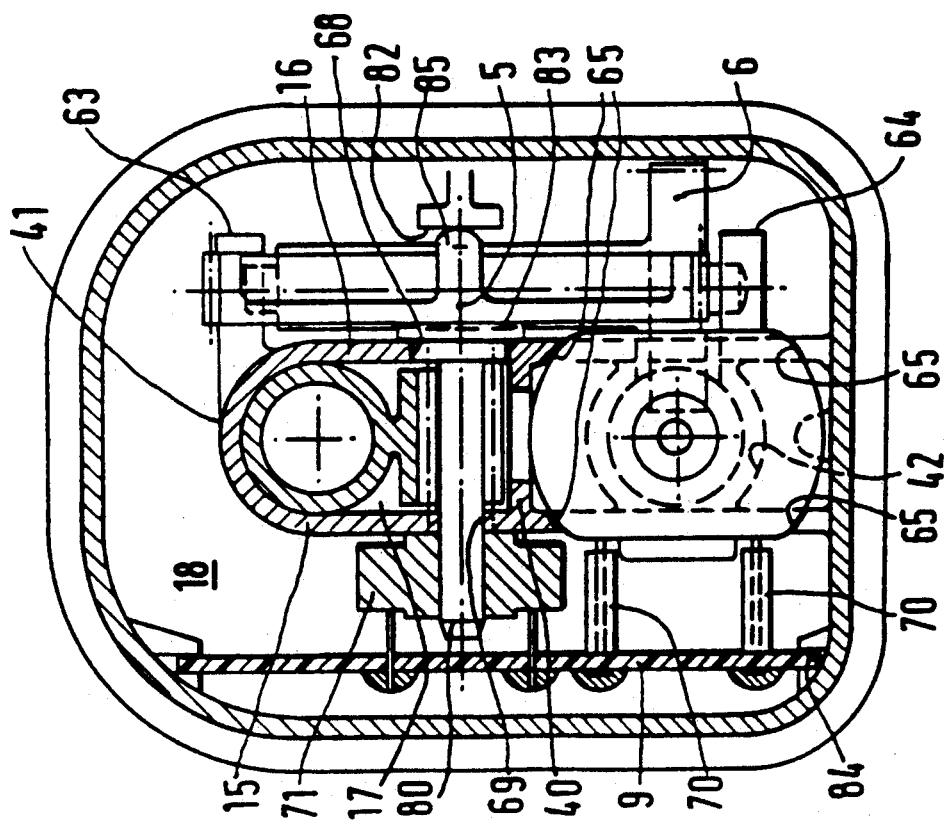

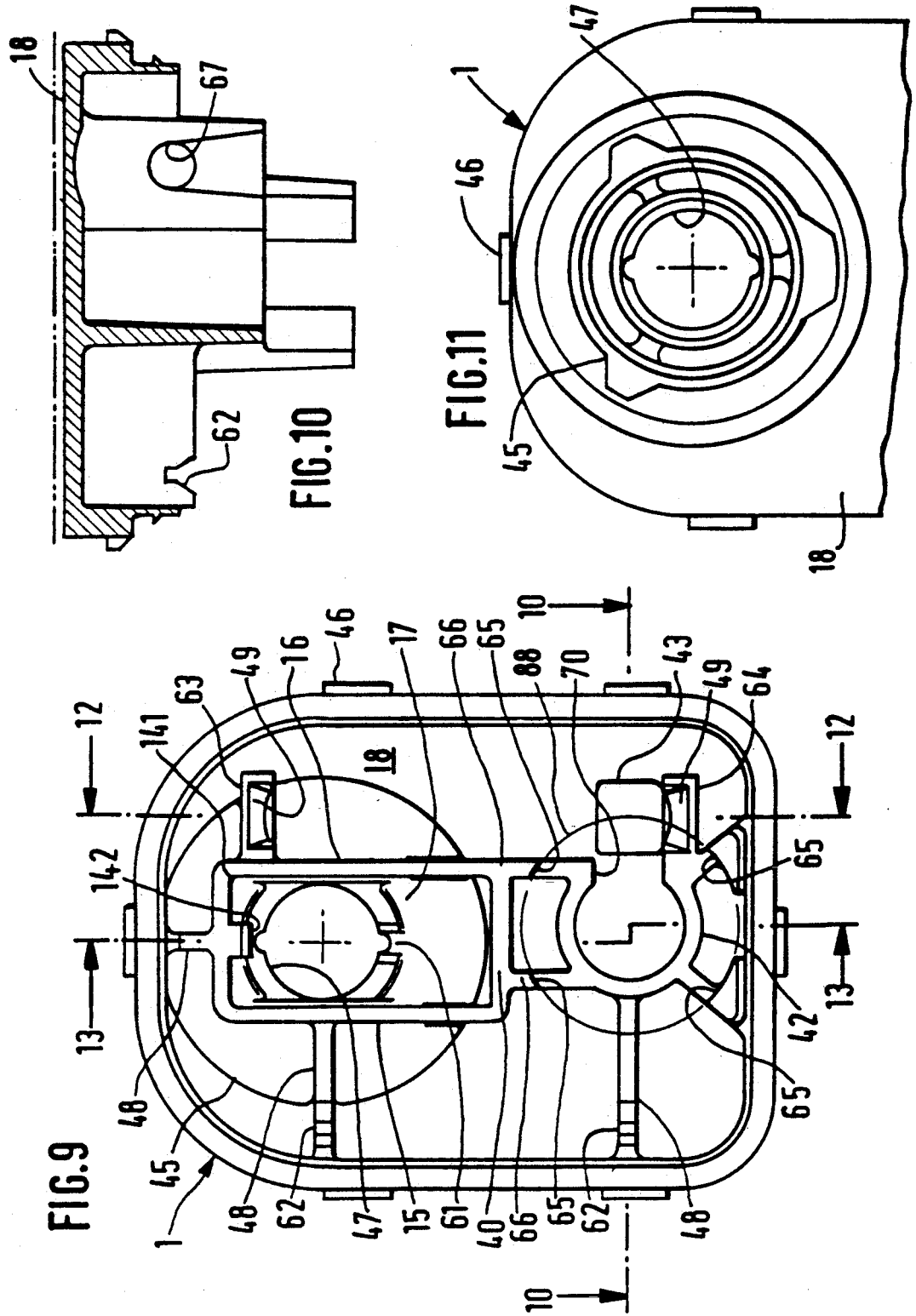

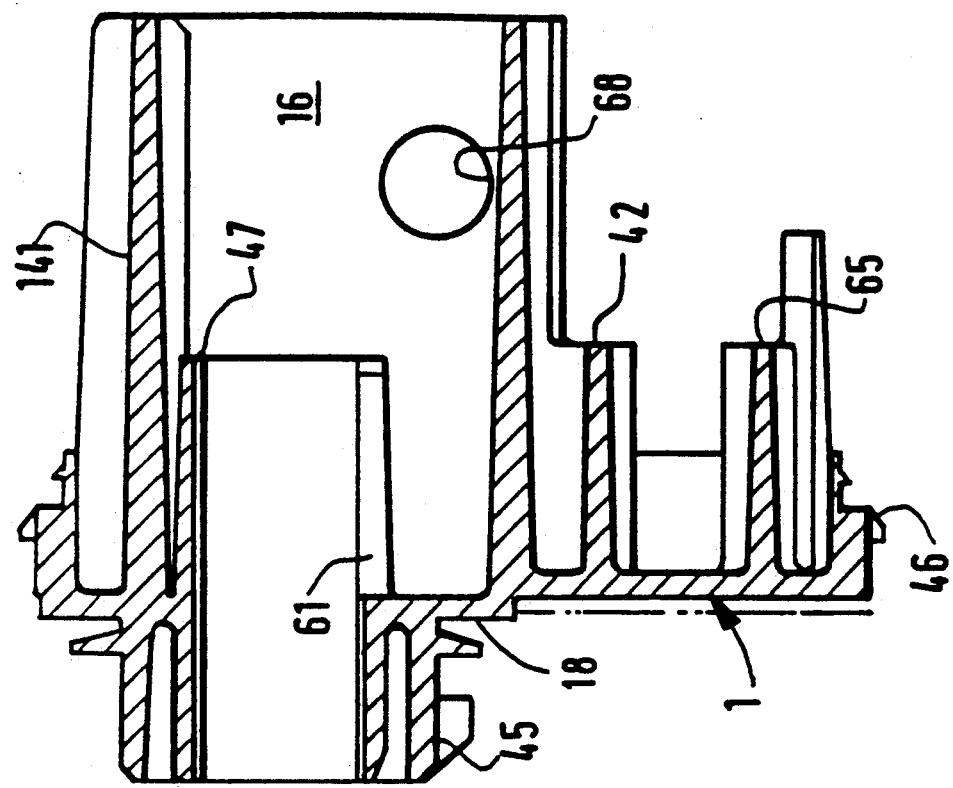
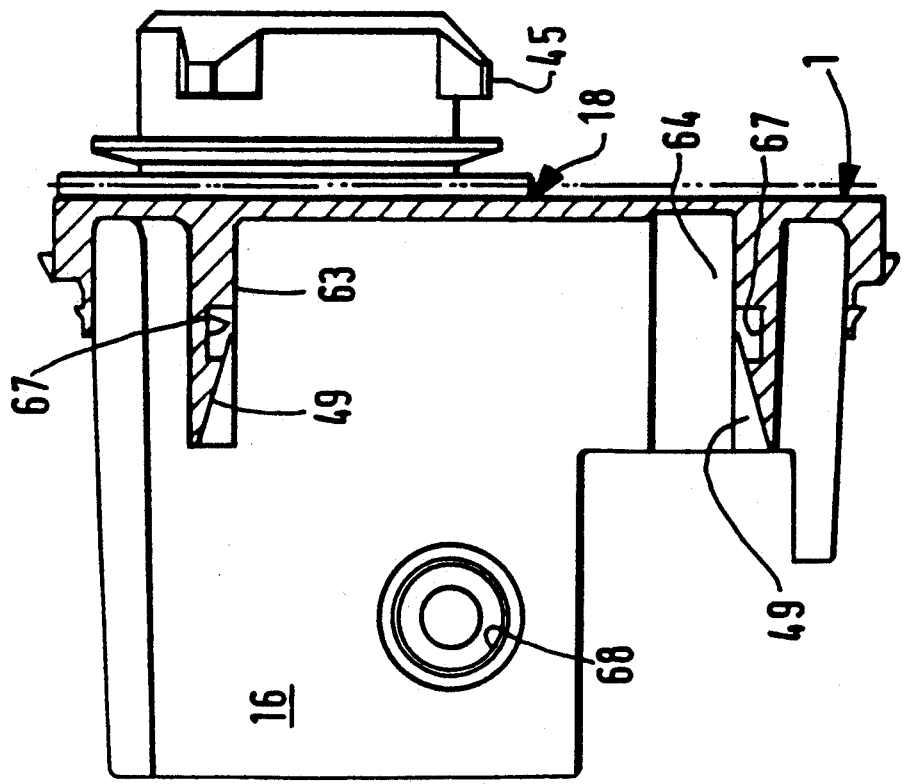

ACTUATOR FOR CONTROLLING THE ORIENTATION OF A MOTOR VEHICLE HEADLAMP

FIELD OF THE INVENTION

This invention relates to an actuator for controlling the orientation of a motor vehicle headlamp. More particularly, it includes such an actuator of the kind comprising a body for supporting the other components of the actuator and comprising a housing which is closed by a cover, together with an actuating rod sliding in the housing, for controlling the orientation of the headlamp and mounted in the body so as to extend through a front wall of the housing, a reversible electric motor mounted in the body for driving the sliding actuating rod through a mechanical transmission which includes a drive element that engages the actuating rod.

BACKGROUND OF THE INVENTION

An actuator of the above kind is described in the specification of European published patent application No. EP 0 291 379A, in which the drive element is fixed with respect to a wheel having a pin for rotational mounting in a bearing, which is fixed to the cover of the actuator body. This cover undergoes deformations during the sliding action of the actuating rod, in such a way that the displacement of the latter is not as precise as might be desirable.

In addition, the mounting of the pin of the wheel in its bearing makes it necessary to take certain precautions, particularly in connection with manufacturing tolerances, such that the cover will effectively close the housing while also supporting the wheel. There is thus a whole range of geometrical considerations that have to be taken into account.

SUMMARY OF THE INVENTION

An object of the invention is to overcome these drawbacks and to provide a novel actuator which will operate in a more accurate way, and which can also be assembled in a simpler manner, while also producing further advantages.

According to the invention, an actuator of the kind described under the heading "Field of the Invention" above is characterised in that the housing carries at least one internal, projecting lateral wall, and in that the said lateral wall is arranged to support an intermediate element of the mechanical transmission, with the intermediate element engaging the drive element.

The intermediate element is thus carried by the housing, in such a way that the cover does not undergo any deformation while the actuating rod is operating, so that greater accuracy is obtained in operation. In addition, the cover closes the housing without interfering with the intermediate element, which facilitates assembly of the actuator. Besides this, the positioning of the intermediate element is easier, since it does not involve the cover. The geometrical criteria are therefore easier to satisfy.

The lateral wall is preferably carried by the front wall of the housing.

In accordance with another feature of the invention, the front wall of the housing carries a second lateral wall projecting inwardly therefrom in the housing, with the lateral walls being disposed on either side of the drive element and of the actuating rod.

The intermediate element may therefore include a wheel which is supported transversely by the said lateral walls and which engages with a rack, with the drive element including a rack for this purpose.

It is a result of the foregoing arrangement that the performance of the actuator is improved.

In accordance with a further preferred feature of the invention, the housing defines three zones within it, namely a first outer zone for mounting therein of the printed circuit which is associated with the motor of the actuator, a second or middle zone supporting the intermediate element, and a third zone, or second outer zone, in which a road sensor device is mounted, so that it engages firstly with the intermediate element and secondly with a worm secured on the motor shaft. The housing is thus able to carry the majority of the components of the actuator.

In accordance with a further feature of the invention, the front wall of the housing carries an axial sleeve portion for carrying the electric motor by simple endwise insertion therein, and the housing includes a shoulder for retaining the motor in position.

This arrangement uses the cover in order to locate the motor against axial movement, with the motor axis then extending parallel to the actuating rod.

According to yet another preferred feature of the invention, the printed circuit includes a connector having projecting pins adapted to pass through the housing and including also a sealing lip. Using this arrangement, since the printed circuit is carried in the housing by locating means defining a guide rail and fixed with respect to the latter, during assembly of the actuator the cover is brought into a closing relationship with the housing while also sealing the connector.

Preferred embodiments of the invention will be described below, by way of example only and with reference to the accompanying drawings.

BRIEF DESCRIPTION OF THE DRAWINGS

FIG. 1 is an elevation view of the actuator in accordance with the invention.

FIG. 2 is a view showing the rear face of the actuator seen in FIG. 1.

FIG. 4 is a view similar to FIG. 2, but with part of the cover and some components carried by the cover being omitted, and with the actuating rod also omitted.

FIG. 5 is a view in cross section showing the assembly of the connector for the printed circuit with the cover.

FIG. 6 is a view in cross section showing the actuator.

FIG. 7 is a view in cross section taken on the line 7—7 in FIG. 6.

FIG. 8 is a view showing a detail indicated in FIG. 6 by the circle denoted by a bold numeral 8.

FIG. 9 is a rear elevation showing the interior of the housing in a second embodiment of the actuator in accordance with the invention.

FIG. 10 is a plan view in cross section taken on the line 10—10 in FIG. 9.

FIG. 11 is a front elevation of part of the actuator, showing the front face of the housing.

FIG. 12 is an elevation in cross section, taken on the line 12—12 in FIG. 9.

FIG. 13 is an elevation in cross section taken on the line 13—13 in FIG. 9.

DESCRIPTION OF PREFERRED EMBODIMENTS OF THE INVENTION

Figure 3:
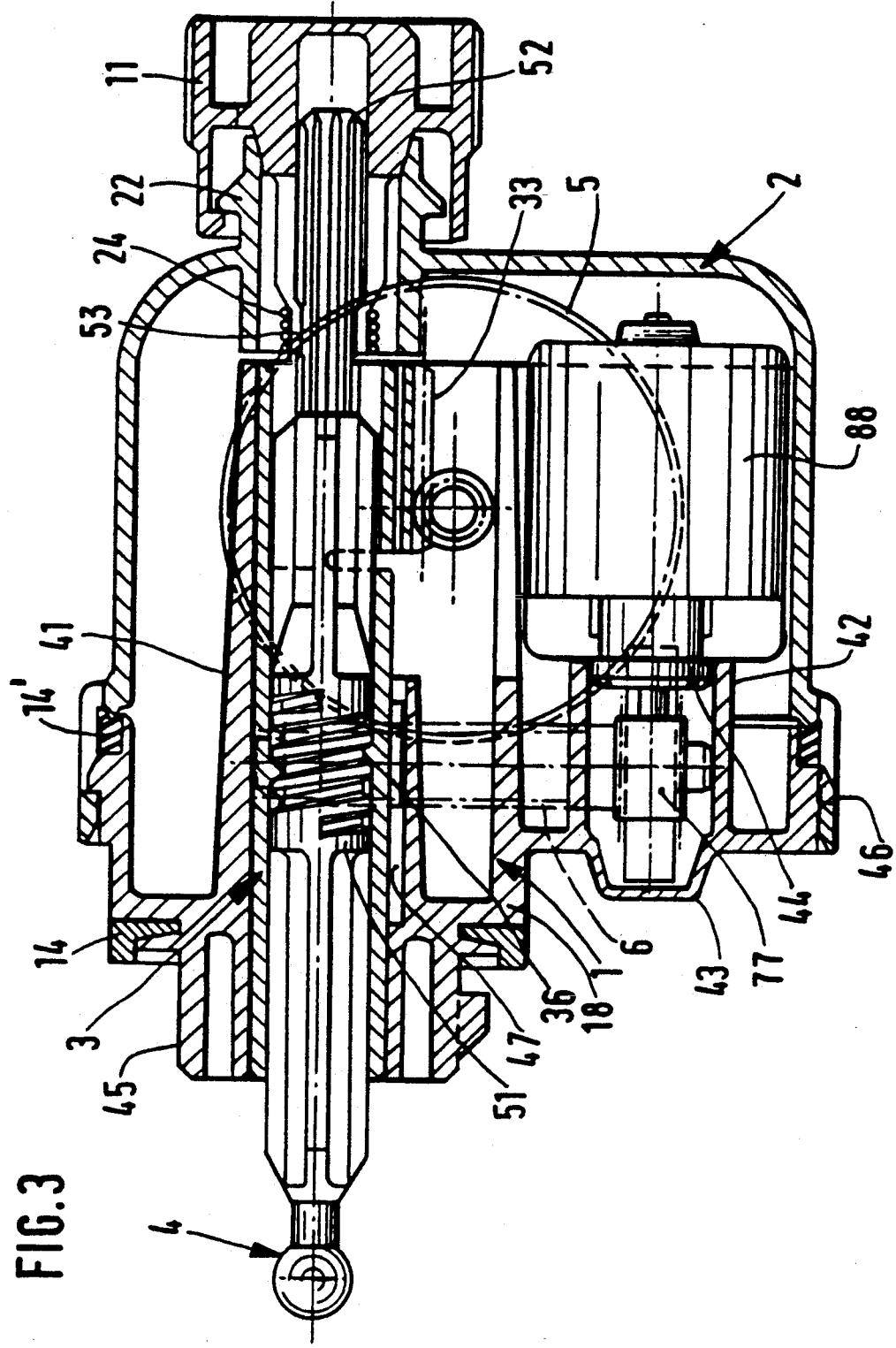
FIG. 3 is a view of the actuator in axial cross section.
Figure 14:
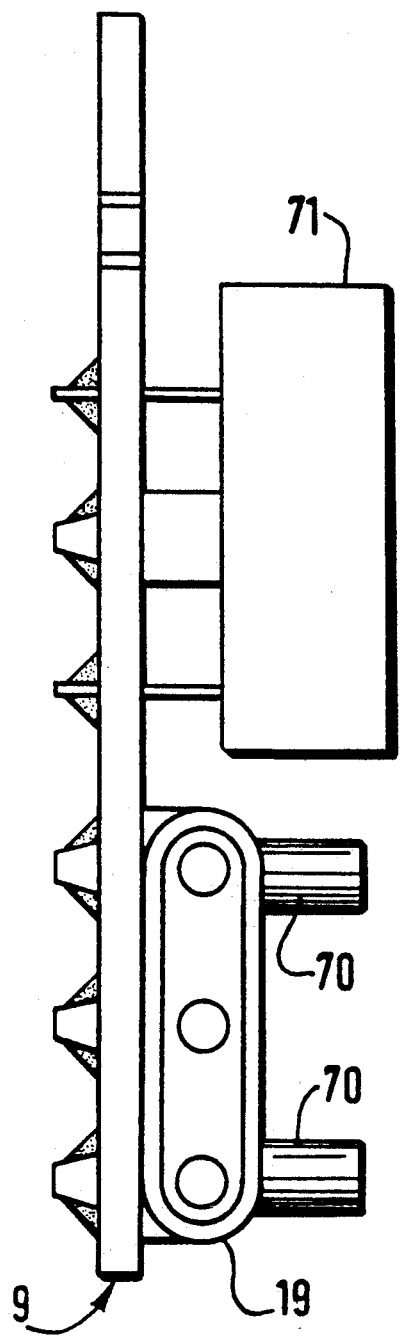
FIG. 14 shows the printed circuit.

The actuator which will now be described with reference to the drawings is an actuator for controlling the orientation or setting of a motor vehicle headlamp. The actuator comprises a hollow body for supporting the various other components of the actuator. This hollow body 1, 2 takes the form of a housing 1 closed by a cover 2. The housing 1 has a front wall 18 with a notched nose portion 45 projecting axially forward from the front wall for supporting the actuator on the motor vehicle headlamp.

In this example, the housing 1 and the cover 2 are of plastics material, for example a polyamide reinforced with glass fibres, and are assembled together by clipping action so as to form a sealed body. For this purpose the housing 1 has notched projections 46, and the cover 2 has teeth and slots through which the projections 46 can extend, with seals 14 in the joints. The cover 2 encloses the housing 1 apart from the nose portion 45.

A sliding actuating rod 4 for adjusting the headlamp is mounted in the housing and extends through the front wall 18 of the housing 1 and through the nose portion 45. The headlamp, and in particular an optical portion of the latter, may occupy, in the usual way, a plurality of angular positions. To this end, the actuating rod 4 acts on the pivoting reflector of the headlamp to adjust its orientation in accordance with the relevant national or international (for example European) standards.

A reversible electric motor 88 is mounted within the hollow body, for actuating the sliding actuating rod 4 through a mechanical transmission, which includes a drive member 3 which engages the actuating rod 4. The free end of the actuating rod 4 is spherical for cooperation with the headlamp, so as to adjust the inclination of the latter.

At least one lateral wall 16 projects internally of the housing 1. The lateral wall 16 is so shaped as to support an intermediate element 5 which is part of the mechanical transmission mentioned above and which comes into engagement with the drive element 3. In this example, the wall 16 projects from, and is carried by, the front wall 18, to extend parallel to the actuating rod 4, the latter being movable axially. The wall 16 also extends parallel to the side walls of the housing (see FIGS. 4 and 9) on the opposite side from the nose portion 45.

In FIGS. 4 and 9, the front wall 18 carries a second projecting lateral wall 15, parallel to the first wall 16. The two lateral walls 15 and 16 extend axially on either side of the drive element 3 and actuating rod 4.

The intermediate element 5 consists of a small wheel and a large wheel. The small wheel is arranged to come into engagement with a rack 33 carried by the drive element 3. The latter is mounted for axial sliding movement in a cylindrical sleeve 47 which is secured to the wall 18 and the nose portion 45, with ribs connecting the cylindrical sleeve 47 to the nose 45 as can be seen in FIG. 11. In FIG. 4, the upper wall of the cylindrical sleeve 47 is part of a semi-circular wall 41 which joins the two projecting lateral walls 15 and 16 together. It will be noted from FIG. 3 that the semi-circular wall 41 extends axially beyond the cylindrical sleeve 47 itself.

In the second embodiment as seen for example in FIGS. 11 and 13, the cylindrical sleeve 47 is separate from the wall 141 which corresponds to the wall 41 in FIGS. 3 and 4. In this second embodiment the wall 141 is flat, and extends radially and axially beyond the sleeve 47. The rear face of the axially orientated sleeve 47 has a groove 61 which is open axially. The groove 61 is arranged to cooperate with a boss 36 which is fixed to the drive element 3. The drive element 3 is thus mounted for translational movement with respect to the housing 1, but is secured against rotation with respect thereto, while surrounding the actuating rod 4.

The drive element 3 is hollow, having an internal bore which carries two projections 31 and 32, these latter being inclined as can be seen in FIG. 8. The drive element 3 comes into engagement with the actuating rod 4 through these projections 31 and 32. See in particular FIGS. 6 and 8. In this example, the projections 31 and 32 are arranged to cooperate with a helical groove which is formed in a portion 51 (FIG. 3) of the actuating rod 4, so as to move the actuating rod 4 axially.

Referring to FIGS. 6 and 7, the rack 33 is carried by the rear face of the drive element 3, i.e. the face furthest from the nose portion 45. The main part of the drive element 3 is enlarged in the region of the rack, with a flat lower wall 37 (FIG. 7) carrying a central, axially extending rib 34 defining a foot portion on to which the rack 33 is secured parallel with the flat lower wall of the main body of the drive element 3.

Again as shown in FIG. 7, in a position which is generally diametrically opposed to the rack 33, the drive element 3 has two curved lugs 35. These lugs 35 are arranged to cooperate with the wall 41 (FIGS. 3 and 4) or 141 (FIGS. 9 and 13) that joins the two lateral walls 15 and 16 together. In FIG. 4 the lugs 35 cooperate directly with the semi-circular wall 41, whereas in FIG. 9 they cooperate with a central, longitudinally extending bar element 142 which is fixed with respect to the wall 141. The bar element 142 projects radially towards the cylindrical sleeve 47. In this way, the rack 33 is mounted resiliently so as to take up any clearances.

Referring once again to FIG. 4, the intermediate element 5 has a spindle 80 which carries the two wheels of the intermediate element. One end of the spindle 80 is in the form of a trunnion 85 with a rounded end, for cooperation with a shoulder 82 that is a fixed part of the cover 2.

The axially projecting walls 15 and 16 are so shaped as to support the intermediate element 5 transversely with respect to the actuating rod 4. More precisely, the lateral walls 15 and 16 have respective openings 69 and 68 through which the spindle 80 extends. In this example, these openings 69 and 68 are in the form of holes, the diameter of the hole 69 being smaller than that of the hole 68. The hole 69 is so dimensioned as to receive the free end of the spindle 80, while the hole 68 is dimensioned so as to receive a shouldered portion 83 of variable diameter, formed on the element 5 in the hub portion of its large wheel. The minimum diameter of the portion 83, and that of the complementary hole 68, is greater than the diameter of the small wheel of the element 5.

Thus, the element 5 can be fitted into the holes 68 and 69 by simple insertion. The small wheel of the intermediate element 5 is disposed radially inward of the rack 33, in such a way that any clearance is automatically taken up by virtue of the lugs 35 and the rib 34 (FIG. 7) of the drive element 3. The performance of the transmission is thus improved, as is the precision of operation of the actuator itself.

The housing 1 comprises three zones, namely a first outer zone, a second or middle zone, and a third (or second outer) zone. The first outer zone is provided for accommodating a printed circuit 9 for controlling the electric motor 88 (FIGS. 3 and 5) of the actuator and for its power supply. The middle zone comprises the lateral walls 15 and 16 and the connecting wall 41 (FIG. 4) or 141 (FIG. 9). The third zone is arranged to contain a road sensor device 6 which engages the intermediate element 5. More precisely, the road sensor device 6 has a worm wheel which engages a worm 17, FIG. 5, which is fixed on the output shaft of the electric motor 88. The device 6 also has a worm which meshes with the large wheel of the intermediate element 5.

The front wall 18 of the housing has two axially projecting bracket elements 63 and 64. These bracket elements 63 and 64 are extended in hook-shaped tongues. See in particular FIGS. 9 and 12. The hook-shaped tongues 49 define recesses 67 in which the ends of the road sensor device 6 are fitted. One of the bracket elements 63, 64 is fixed to the side of the lateral wall 16, while the other bracket element is fixed to ribs which will be described below. The radial spacing between the two bracket elements 63 and 64 (FIGS. 4 and 9) depends on the dimensions of the road sensor device 6. The device 6 can thus be fitted by snap action on to the two bracket elements 63 and 64, so as to extend parallel to the lateral wall 16 and transversely to the intermediate element 5.

The housing 1 is preferably of plastics material, with all of the various walls 15, 16, 41, the bracket elements 63 and 64 and the cylindrical sleeve 47, all being integrally formed by molding with the front wall 18.

It will be noted from FIG.4 and 9 that the lateral walls 15 and 16 are connected together in their lower part by a further wall 40, which is perpendicular to both of the lateral walls 15 and 16. Thus a generally rectangular chamber 17 is defined between the lower connecting wall 40 and the upper connecting wall (41 in FIG. 4 or 141 in FIG. 9), and the lateral walls 15 and 16. The cylindrical sleeve 47 extends within this chamber 17, while the bracket elements 63 and 64 extend in the third zone mentioned above, laterally with respect to the chamber 17 and on a first side of the latter.

A sleeve portion 42 is arranged in the middle zone, radially inwardly of the chamber 17. As shown in FIG. 9 at 70, the sleeve portion 42 is open at the side to accommodate the wheel of the road sensor device 6, and the nose portion 44 (FIG. 3) of the electric motor 88 fits into the axial open end of the sleeve portion 42. As is best seen in FIG. 3, the sleeve portion 42 is an integral part of the front wall 18, which also has an outwardly directed, cup-shaped projection 43, which is hollow in line with the sleeve portion 42 so as to clear the output shaft of the motor 88. FIG. 9 shows the sleeve portion 42 joined to the lateral walls 15 and 16 through ribs. One of these ribs is an extension of the lateral wall 16, with which it is integral, while the other rib is offset axially from the lateral wall 15.

Further ribs 48 are also provided so as to join the walls 15 and 16 and the sleeve portion 42 to the inner surface of the housing 1, and to the front wall 18 of the latter.

It will be noted that in every case the sleeve portion 42 extends from the front wall 18 by a shorter length axially than the walls 40, 41 or 141, 15 and 16; and that the ribs define shoulders 65 resulting from this axial offset. In FIG. 9 there are four of these shoulders 65, which locate the body of the electric motor 88 in position. The sleeve portion 42 extends parallel to the sleeve 47, being oriented axially like the lateral walls 15 and 16. These walls 15 and 16, like the walls 41 and 141 and the sleeve portion 42, project axially from the walls which define the outer contour of the housing 1, and facilitate its assembly with the cover 2.

Some of the ribs 48 are provided with notches 62 (see FIGS. 9 and 10), which are outwardly divergent but which have a base portion so shaped as to receive the circuit board of the printed circuit 9 within its thickness.

In FIG. 4, the housing 1 also has recesses 84, which are parallel to the sleeve portion 42 and which are formed in the front wall 18.

Figure 15:
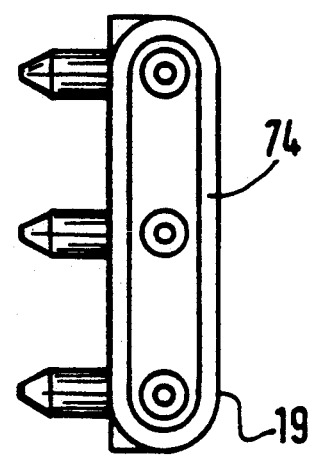
FIG. 15 shows the printed circuit connector.

All of the arrangements described above provide means for fixing the circuit board of the printed circuit 9, and guide rails for the printed circuit board, such that the latter can be fitted by slipping it into position. The circuit board 9 carries an electrical circuit of predetermined design, together with a connector 19; a potentiometer 71 and tube portions 70 for the electrical connection of the motor 88. The circuit board is designed to be fitted by a snap action to the potentiometer 71 and to the connector 19, which carries two sets of pins, with three pins in each set (see FIG. 15). Each set of pins is arranged at an angle of 90 degrees with respect to the other. The tube portions 70 are arranged to be fitted over further pins 72, which are carried by the electric motor 88 for the electrical supply of the motor. These pins 72 extend at right angles to the body of the motor 88 and at right angles to the sleeve portion 42 (FIGS. 4 and 5). They extend into the zone which is delimited by the lateral wall 15 and the lateral wall of the housing 1. It will be noted that the circuit board of the printed circuit 9 is secured against axial movement after being fitted in its guide rails, by the potentiometer 71 which is held in place by the spindle 80 of the intermediate element 5. The latter thus has an additional function.

Thus during assembly, it is possible to fit the printed circuit 9 to the motor 88 by introducing the pins 72 into the tubes 70 and then to complete fitting by simple axial relative movement, since the circuit board of the printed circuit 9 is parallel to the lateral walls 15 and 16.

Figure 16:
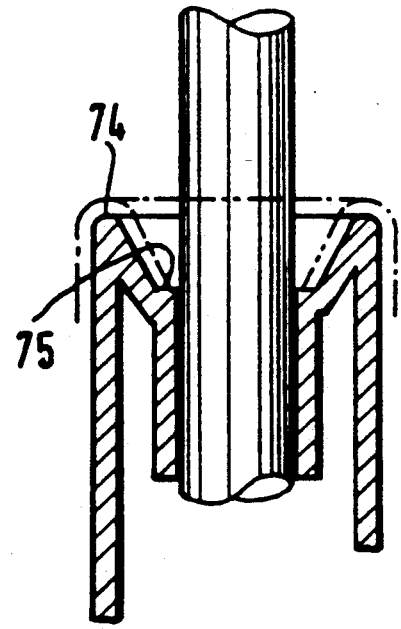
FIG. 16 is a partial view showing the sealing lip of the printed circuit connector.

Referring again to FIG. 15, the connector 19 has a sealing lip 74, and one of its sets of pins is arranged to pass through the cover 2. The lip 74 is continuous and surrounds the pins of that set. The lip 74 is hollow and divergent outwardly as can be seen in FIG. 16. It thus defines a cavity having a base 75 through which the three pins (one of which is seen in FIG. 16) extend sealingly. As can be seen in FIGS. 1, 2 and 5, the cover 2 has a hollow shroud portion 20 which extends axially outwards from the rear wall of the cover, and which surrounds the three pins of the connector 19 that passes through it. The pins extend through the base 23 of the shroud 20, the latter being open to the outside. The cover 2 also has a shouldered portion 21, FIG. 5, adjacent to the shroud portion 20. The shouldered portion 21, like the shroud portion 20, is formed in the rear or base wall of the cover 2.

As will have been understood from the foregoing, all of the various components of the actuator, namely the printed circuit 9 with the connector 19, the motor 88, the mechanical transmission with its drive element 3, and the actuating rod 4, can be preassembled into the housing 1. All that is finally necessary is then to snap-fit the cover 2 on to the housing 1. During this operation, the pins of the connector 19 pass through the openings in the base 23 of the shroud portion 20, and the shouldered portion 21 comes into contact with the posterior face of the motor 88, as is shown in FIG. 5. During this operation, the cover 2 squeezes the sealing lip 74, thus achieving the required sealing effect in the region of the connector 19. The sealing lip 74 is of a resilient material such as Santoprene.

In addition, the motor 88 is supported axially by the shouldered portion 21, being held against axial movement between the shouldered portion 21 and the shoulder 65.

Referring once again to FIG. 3, the posterior end portion 52 of the actuating rod 4 is grooved (in this example it is splined), and the actuating rod 4 extends beyond both ends of the drive element 3.

The rear or base wall of the cover 2 has a shouldered sleeve portion 22 surrounding the posterior end portion 52 of the rod 4. The shouldered sleeve portion 22 extends outwardly, and an adjusting member 11 is snap-fitted on to it. In this example the adjusting member 11 is a knurled knob. The knob engages with the splined end portion 52 of the actuating rod through resilient tongues 53 which are integral with the knob. The tongues 53 are surrounded by a resilient element 24. A force limiter is thus constituted in the manner described in the specification of French published patent application No. FR 2 643 318A, and the position of the actuating rod 4 is able to be adjusted initially using the knob. More precisely, during this initial adjustment, with the motor 88 and drive element 3 immobilised, the knob drives the end portion 52 of the rod 4 in rotation, and this rotational motion is converted into translational movement by the groove 51 and the projections 31 and 32 of the stationary drive element 3.

The force limiter is in a freely engaging configuration, with the resilient tongues 53, which have projections for cooperating with the grooves on the actuating rod 4, being in engagement, under the action of the resilient element 24, with the end portion 52 of the rod 4. In the event of there being any resistance to translational movement of the actuating rod 4, the tongues 53 will jump from one spline to another, the resilient element 24 permitting this action.

Since the sleeve portion 22 carrying the knob is coaxial with the actuating rod 4, the actuator can thus be assembled by simple axial movement of the cover 2 on the housing 1, with the cover 2 carrying only auxiliary components. It will be noted that fitting of the actuating rod 4 into the drive element 3 is carried out by force-fitting and by engagement of the projections 31, 32 with the groove 51.

In normal operation, the electric motor 88 drives the worm 77, the road sensor device 6, the intermediate element 5, the drive element 3 and the actuating rod 4. As already mentioned, the rotational motion of the drive element 3 is converted into translational movement due to the groove 51, the projection 36 engaging the groove 61, and the splines of the posterior end portion 52 of the actuating rod 4. The snap-fitted knob then prevents any rotation of the actuating rod 4. Each position of the actuating rod 4 corresponds to a different angular position of at least one optical part of the headlamp, for example its reflector.

It will also be noted that the spindle 80 of the intermediate element 5 is able to be inserted into the potentiometer 71 for the purpose of driving the latter and holding the circuit board of the printed circuit 9 in place. Thus, the motor 88 is first fitted with its printed circuit, and then with the intermediate element 5. A shoulder 82 is of course provided in order to hold the intermediate element 5 axially in position. This shoulder 82 is preferably fixed with respect to the cover 2, and is adapted to cooperate with the trunnion 85 of the spindle 80, the trunnion 85 being adjacent to the large wheel of the intermediate element 5.

As will be well understood from the foregoing description, all the various components of the actuator, apart from the adjusting knob, are carried by the housing 1, while all these components are fitted by simple axial movement or snap action, the cover 2 constituting a closure member which surrounds the housing 1 and holds the motor 88 in place axially, ensuring also that the required sealing effect is obtained in the region of the connector 19. The whole of the mechanical part, and the motor, lies in the second and third of the three zones discussed above.

The present invention is of course not limited to the embodiments described. In particular, the lateral walls 15 and 16 may be provided with cradle elements to receive the spindle 80. The end of the spindle 80 adjacent to the large wheel of the intermediate element 5 may be mounted in a cradle element which is fixed with respect to the housing 1 or the cover 2. Thus the spindle 80 can be cantilevered by being supported by the lateral wall 16 and the said cradle element. The spindle then extends through the lateral wall 15 with a clearance.

The lateral walls 15 and 16 may be arranged so that they are only parallel to each other over part of their length. In a variant, they may be fixed with respect to the housing 1, without extending from the front wall of the latter, this being achieved for example by the use of ribs connecting them to other parts of the housing 1.

What is claimed is:

1. An actuator for controlling the orientation of a motor vehicle headlamp, having a substantially hollow body comprising: a housing and a cover for closing the housing, the housing having a front wall, support means integrally formed with the housing; an actuating sliding rod carried by said support means and extending through said front wall for controlling the headlamp orientation, a reversible electric motor and a mechanical transmission, supported within the housing, said mechanical transmission including a drive element engaging and operating the sliding actuating rod and an intermediate element, at least one first lateral wall projecting internally and forming part of the housing, said intermediate element being in operative engagement with said drive element and being supported by said at least one first lateral wall, and a second lateral wall projecting internally and forming part of the front wall of the housing, the at least one first and the second lateral wall being disposed on either side of the drive element and sliding actuating rod.

2. An actuator according to claim 1, further including a rack, said drive element including a main portion and a foot portion, said rack being carried by said foot portion, and the intermediate element being a small wheel cooperating with the rack.

3. An actuator according to claim 1, wherein the housing comprises means defining three zones therein, namely a middle zone including the said at least one first and second lateral wall, a first outer zone on one side of the middle zone and a second outer zone on another side of the middle zone, a printed circuit for controlling the reversible electric motor and for supplying it with power, said printed circuit being mounted in the first outer zone, and wherein the mechanical transmission further includes a road sensor device disposed in said second outer zone and arranged for engagement with the intermediate element.

4. An actuator for controlling the orientation of a motor vehicle headlamp, having a body comprising a housing and a cover for closing the housing, the housing having a front wall, support means forming part of the housing, an actuating rod slidingly carried by the support means and extending through said front wall for engagement with a headlamp, a reversible electric motor and mechanical transmission means within the housing, said transmission means comprising a drive element engaging and operating the actuating rod, first and second lateral walls projecting internally and carried by the front wall of the housing, the mechanical transmission means further including an intermediate element in operative engagement with said drive element and being supported by said first and second lateral walls, the first and the second lateral walls being disposed on either side of the drive element and the actuating rod and wherein each of the first and second lateral wall has an opening, the intermediate element including a spindle extending through the openings.

5. An actuator according to claim 4, wherein said intermediate element has a shouldered portion having a minimum diameter corresponding with the diameter of one of the openings that is formed in said first lateral wall, the intermediate element having a wheel, the minimum diameter of the shouldered portion of the intermediate element being greater than the diameter of the wheel.

6. An actuator according to claim 4, wherein the housing comprises means defining three zones therein, namely a middle zone including the said first and second lateral walls, a first outer zone on one side of the middle zone and a second outer zone on another side of the middle zone, a printed circuit for controlling the reversible electric motor and for supplying it with power, said printed circuit being mounted in the first outer zone, and wherein the mechanical transmission means further includes a road sensor device disposed in said second outer zone and arranged for engagement with said intermediate element.

7. An actuator according to claim 6, further comprising two bracket elements carried by and projecting from the front wall of the housing, and tongues extending from said bracket elements, said road sensor device being carried by said bracket elements.

8. An actuator according to claim 7, wherein said tongues are provided with recesses, for cooperation with said road sensor device.

9. An actuator according to claim 8, wherein one of the bracket elements is joined laterally to the first lateral wall.

10. An actuator according to claim 6, wherein the housing includes a chamber defined by said first and second lateral walls, and an axial orientation sleeve portion is joined to the front wall of the housing, said sleeve portion being arranged radially inward of said chamber.

11. An actuator according to claim 10, wherein said axial orientation sleeve portion has an opening for accommodation of the road sensor device, the reversible electric motor having an axially extending nose portion and the axial orientation sleeve portion having an open end in which said axially extending nose portion fits by simple axial insertion.

12. An actuator according to claim 6, further comprising a connector carried by the printed circuit, said connector having a sealing lip, the cover having a base portion, and the connector further including pins for extending through said base portion.

13. An actuator according to claim 12, wherein the printed circuit has a circuit board and the housing further includes means for guiding and securing the circuit board in position.

14. An actuator according to claim 13, wherein the reversible electric motor has projecting pins and the circuit board has tube elements for cooperating with said projecting pins of the reversible electric motor.

15. An actuator for controlling the orientation of a motor vehicle headlamp, having a body comprising a housing and cover for closing the housing, the housing having a front wall, support means forming part of the housing, an actuating rod slidingly carried by the support means and extending through said front wall for engagement with a headlamp, a reversible electric motor and mechanical transmission means within the housing, said mechanical transmission means comprising a drive element engaging and operating the actuating rod, at least one first lateral wall projecting internally and carried by the housing, said mechanical transmission means including an intermediate element in operative engagement with said drive element, and being supported by said at least one first lateral wall, said actuator further including a rack, said drive element having a main portion and a foot portion, the rack being carried by the foot portion, and the intermediate element having a small wheel cooperating with the rack, and said drive element has at least one curved lug in a position diametrically opposed to the rack, said front wall of the housing having a further wall joined to said at least one first lateral wall for cooperation with the said at least one curved lug whereby the rack is mounted resiliently to take up any clearances.

* * * * *